Patented Sept. 12, 1933

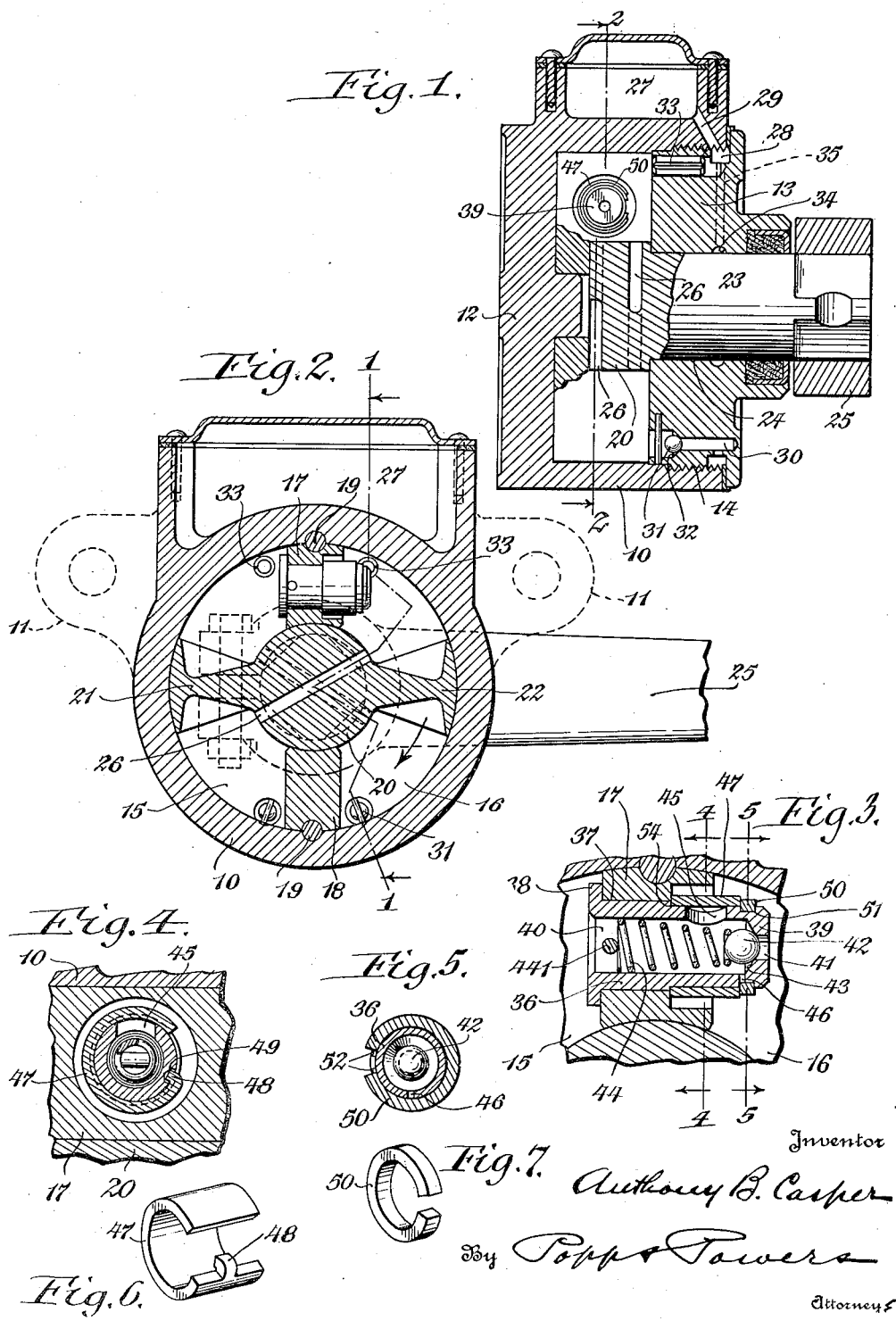

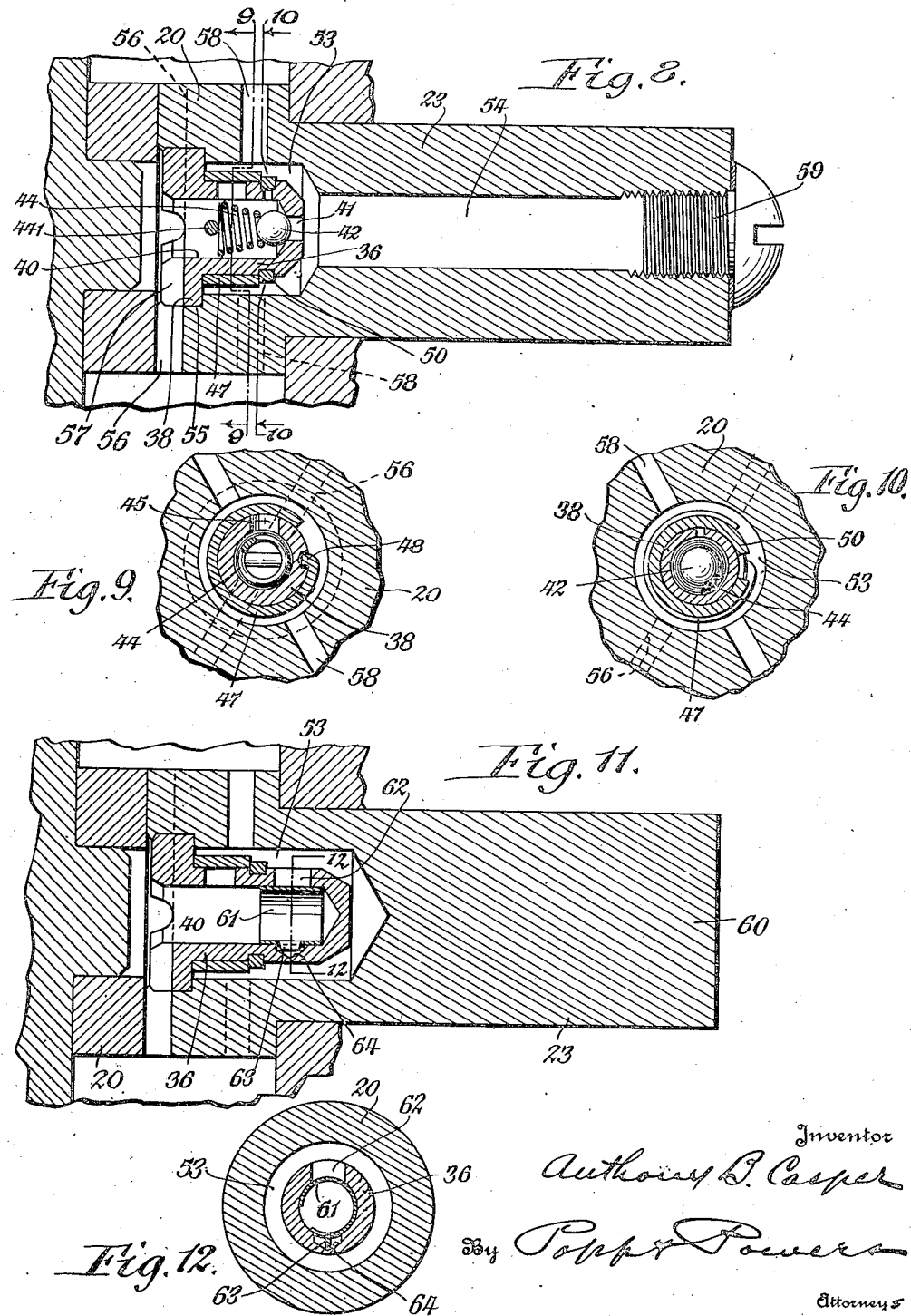

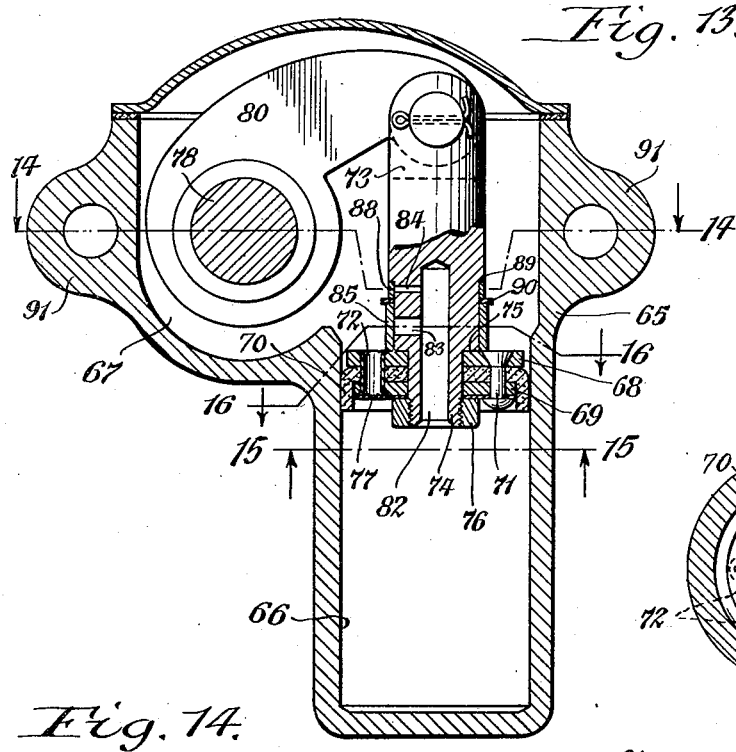
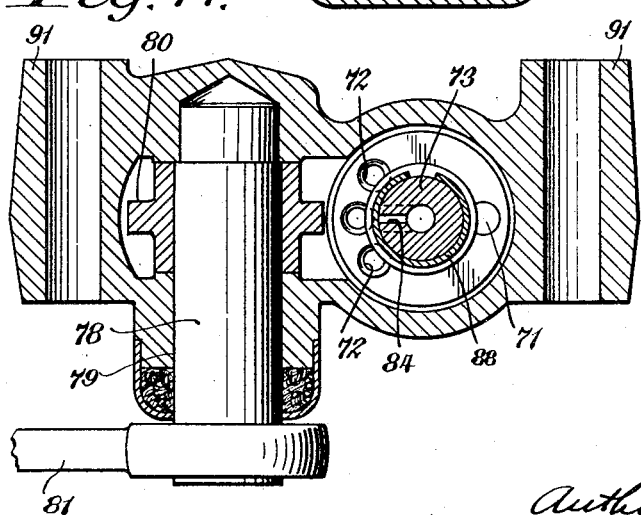
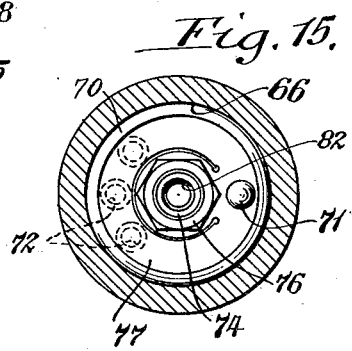
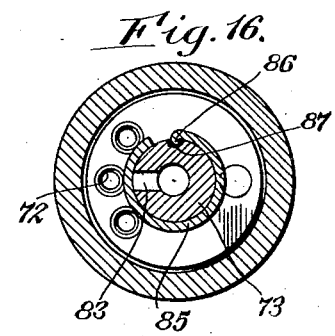

1,926,800

UNITED STATES PATENT OFFICE 1,926,800

SHOCK ABSORBER

Anthony B. Casper, Buffalo, N. Y., assignor to Houde Engineering Corporation, Buffalo, N. Y., a corporation of New York Application June 9, 1931. Serial No. 543,097

8 Claims. (Cl. 188—88)

This invention relates to a hydraulic shock absorber used more particularly in power driven vehicles to absorb sudden shocks of stoppage or rebound while running over bad roads, and to protect the springs from breakage due to excessive rebound, but this absorber may also be advantageously employed in connection with relatively movable parts of other installations for cushioning the movements between the same.

It is the object of this invention to provide a shock absorber of this character with a valve mechanism constituting a single unit but performing the triple functions of determining the low or normal working pressure of the instrument, the high or maximum pressure under which the same can operate and also to permit flow of the resistance liquid from the low pressure or non-compression end of a working chamber to the high pressure or compression end of a working chamber during low pressure or non-compression strokes of the piston.

A further purpose of this invention is to provide a valve mechanism of this character which is simple and inexpensive in construction and capable of being easily applied to the absorber and removed therefrom, and which is compact and adapted for installation where limited space is available and is so organized that the same can be perfectly calibrated.

In the accompanying drawings:

Figure 1 is a vertical longitudinal section of a hydraulic shock absorber in which the valve mechanism forming the subject of the present invention is mounted on a stationary part of the instrument, taken on line 1—1 Fig. 2.

Figure 2 is a vertical transverse section of the same taken on line 2—2 Fig. 1.

Figure 3 is a fragmentary vertical transverse section of the valve mechanism, on an enlarged scale.

Figures 4 and 5 are fragmentary vertical longitudinal sections taken on the correspondingly numbered lines in Fig. 3.

Figures 6 and 7 are perspective views, respectively, of the high and low pressure relief valves used in the construction shown in Figs. 1-5.

Figure 8 is a fragmentary longitudinal section showing this improved valve mechanism embodied in a movable member of the instrument.

Figures 9 and 10 are cross sections on lines 9—9 and 10—10, Fig. 8, respectively.

Figure 11 is a longitudinal section similar to Fig. 8 showing a modified form of the valve mechanism.

Figure 12 is a cross section taken on line 12—12 Fig. 11.

Figure 13 is a vertical section showing this invention embodied in a hydraulic shock absorber in which a reciprocating piston is employed and no considerable liquid resistance is encountered during the compression action on the spring system of the vehicle.

Figures 14, 15 and 16 are horizontal sections taken on the correspondingly numbered lines in Fig. 13.

In the following description similar characters of reference indicate like parts in the several figures of the drawings.

This invention may be incorporated in hydraulic shock absorbers of different types which will be apparent as the description of the same proceeds. The particular form of shock absorber which is shown in Figs. 1 and 2 as one example adapted for use in connection with this invention is of a well-known type and in its general organization its construction and operation are as follows:

The numeral 10 represents the circumferential wall of the body of the absorber which is adapted to be attached to one of the relatively movable parts between which the shock is to be absorbed in any suitable manner, for instance by means of lugs 11 arranged on opposite sides of the body and adapted to receive bolts or similar fastenings for attaching the same to the frame of an automobile. At its rear end this circumferential wall 10 is provided with a head 12 which is preferably formed integrally therewith, and at its front end this wall is provided with a front head 13 which is preferably detachably connected with this wall by means of a screw joint 14. The space within the annular wall and the front and rear heads of this body is divided into two working chambers 15 and 16 by means of an upright partition which in the present instance consists of upper and lower sections 17 and 18, the outer ends of which are connected with the bore of the annular wall 10 by means of keys 19, while the inner ends of the same are separated and receive between them the circular hub 20 of two pistons 21, 22 which project radially from opposite sides of this hub and oscillate in engagement with the bore of the wall 10 and the inner faces of the front and rear heads 12 and 13.

The hub 20 is arranged at the rear end of a horizontal operating shaft 23 which projects forwardly through the front head 13 and is journaled in a bearing 24 formed on the central part of this head, as shown in Fig. 1. At its front end this shaft is provided with an operating arm 25 which is adapted to be connected in any suitable manner with some part of the automobile or other vehicle which moves relative to the frame thereof, for instance an axle which carries supporting wheels and is yieldingly connected with the frame by a spring suspension system in any usual and well-known manner.

The working chambers are filled with a resistance liquid which is displaced by the pistons while the latter are oscillated therein by motion derived from the movement of the axle and frame of the car toward and from each other, and during this movement the pressure of the liquid in the working chamber is equalized by equalizing passages 26 formed diametrically in the hub and connecting the high pressure or compression end of each working chamber with the low pressure or non-compression end of the other working chamber, as shown in Figs. 1 and 2.

The supply of liquid resistance for replenishing the working chambers when required is derived from a replenishing chamber 27 which is arranged on top of the wall 10 and from which this liquid is supplied to the lower ends of the working chambers by means of an annular passage 28 formed between the periphery of the front head 13 and the adjacent part of the wall 10, an upper supply passage 29 formed in the upper part of the wall 10 and leading from the bottom of the replenishing chamber 27 to the upper part of the passage 28, and delivery passages 30 formed in the lower part of the front head and leading from the lower part of the annular passage 28 to the lower parts of the working chambers. The resistance liquid is permitted to flow from the replenishing chamber through these passages into the working chambers, but is prevented from moving in a reverse direction by means of check valves 31, each of which is arranged in one of the passages 30 and is adapted to engage with a valve seat 32 arranged therein which faces toward the respective working chamber.

Any air which may be present in the resistance liquid is discharged from the upper ends of the working chambers through vent ports 33 leading from the upper ends of these chambers to the upper part of the annular passage 28, as shown in Figs. 1 and 2.

Any resistance liquid which creeps forwardly through the cooperating bearing surfaces between the operating shaft 23 and the front head 13 is intercepted by a groove 34 in the bore of the bearing 24 and conducted from thence by means of a radial passage 35 in the front head to the annular passage 28 and then through the upper passage 29 into the replenishing chamber or reservoir 27 where the same mingles with the supply of resistance liquid for subsequent use in the working chambers to cushion the shock to the vehicle on which the absorber is installed.

The particular form of my invention, as shown in Figs. 1–7, is mounted on a stationary part of the absorber and is constructed as follows:

The numeral 36 represents a tubular valve case, housing or body which extends transversely through an opening 37 in the upper partition section 17 and has that end thereof facing the upper end of the working chamber 15 secured in the partition 17, while the opposite end and the adjacent peripheral part thereof is exposed in the upper end of the other working chamber 16, as shown in Figs. 2 and 3. That end of the valve body 36 facing the working chamber 15 is provided with an annular flange 38 engaging with the adjacent side of the partition 37, and on that end of the valve body which is arranged within the working chamber 16 is provided with a head 39. The bore 40 of this valve body and a port 41 in the head 39 thereof form a by-pass which at times is adapted to connect the upper ends of the working chambers 15 and 16.

During the low pressure or non-compression strokes of the pistons the resistance liquid is forced by the pistons from the upper end of the working chamber 16 through the by-pass 41, 40 and into the upper end of the working chamber 15 so that at this time the resistance liquid is permitted to flow with comparative freedom in advance of the pistons during the low pressure strokes thereof and only a moderate cushioning effect is obtained for absorbing the shock between the axle and frame of the car, one of which at this time moves toward the other. Within the valve body or housing 36 is arranged a check valve 42 preferably of ball form which is adapted to engage with a valve seat 43 surrounding the port 41 and facing toward the working chamber 15 and yieldingly held in engagement with this seat by means of a spring 44 arranged within the valve housing or casing, and bearing at its opposite ends against the check valve 42 and an abutment pin 441 mounted on the valve casing 36 and extending transversely across the bore thereof.

During the high pressure or compression strokes of the pistons, indicated by the direction of the arrow in Fig. 2, the resistance liquid is prevented from passing through the port 41 from the upper end of the working chamber 15 to the upper end of the working chamber 16 due to the check valve 42 at this time engaging with the valve seat 43, thereby causing the resistance liquid to offer a greater resistance to the movement of the pistons while effecting the high pressure or compression strokes of the same, and thereby producing a shock absorbing effect which cushions the rebound or separation of the axle and frame of the automobile at this time.

On that end of the valve housing or body 36 which is arranged within the working chamber 16 a comparatively large relief port 45 is provided which is arranged adjacent to the partition 17 and also a comparatively small relief port 46 which is arranged between the port 45 and the head 39. These ports extend laterally or radially through the valve body 36 and are arranged on opposite sides of this body, as best shown in Fig. 3.

Surrounding that part of the valve body or casing 36 adjacent to the partition 17 is a high or maximum pressure relief valve 47 which is preferably constructed in the form of a curved or C-shaped spring one end of which extends over the high pressure relief port 45 and is capable of lateral movement toward and from the same, while the opposite end of the same is provided with an inwardly projecting lug 48 which engages with a recess 49 in the periphery of the valve body 36 and thereby serves as an anchor for preventing rotation of this high pressure relief valve and thus always maintains the opposite free end of this valve in operative relation to the port 45.

Between the high pressure relief valve and the head 39 of the valve body a low pressure or normal relief valve 50 is arranged which preferably is constructed in the form of the letter C of spring wire which is square in cross section and seated in an annular groove 51 in the periphery of the valve casing 36, so that one end of this normal relief valve 50 covers the low pressure or normal relief port 46, as shown in Figs. 3 and 5. Displacement of the normal or low pressure relief valve 50 in a direction lengthwise of the body 36 is prevented by engagement of its sides with the walls of the groove 51 and circumferential displacement of the same is prevented by deforming the metal on one of the walls of the groove 51 so that this deformation forms stops 52 on the body which engage with the opposing ends of the C-shaped valve 50, as shown in Fig. 5. Expansion of the low pressure or normal relief valve 50 is however possible when the liquid pressure within the valve casing 36 exceeds the tension of this valve.

Displacement of the high pressure or maximum relief valve 47 in a direction lengthwise of the axis of the valve casing 37 is not only prevented by engagement of its anchoring lug 48 with the notch 49 but also by reason of this valve being confined between the shoulder 54 on the valve body 36 and the adjacent side of the low pressure or normal relief valve 50, as shown in Fig. 3.

The tension of the high pressure and low pressure relief valves 47 and 50 is so determined that when the shock absorber operates to cushion or absorb such shocks which are ordinarily experienced in running over a roadway, then the high pressure relief valve 47, owing to its greater strength, will remain closed and only the low pressure relief valve 50 will open due to its lesser strength, thereby permitting some of the liquid during the low pressure or non-compression strokes of the pistons to pass from the upper end of the working chamber 15 through the low pressure relief port 46 and into the upper end of the working chamber 16, which pressures however are also balanced in the corresponding lower ends of the chambers 15 and 16 due to the balancing passages 26, as previously described.

During abnormal high or maximum pressures which may occur within the working chambers while the pistons are moving toward the high pressure ends of these working chambers, which pressures are liable to occur when the car experiences sudden shocks of stoppage or rebound on the road, then the resistance liquid is pushed by the pistons through the high pressure relief port 45 from the upper end of the working chamber 15 to the upper end of the working chamber 16, inasmuch as the heavier relief valve 47 will be expanded by such maximum or abnormal pressure at this time and cause the free end of this valve to uncover the port 45 to permit a larger volume of resistance liquid to flow through the same.

It will therefore be clear from the foregoing that the high pressure relief valve 47 only operates during a period of overload and therefore constitutes a safety valve which prevents breakage or damage to parts of the instrument when subjected to sudden or excessive shocks which otherwise might rupture the instrument if no provision were made for limiting the pressure in the working chambers and preventing such an occurrence. It is to be understood however that the tension on the normal or low pressure relief valve 50 is sufficiently light to permit the same to open during each rebound stroke of the pistons, and therefore opens either alone when only light rebound shocks occur and also opens in conjunction with the high pressure relief valve 47 when rebound shocks occur which are heavier than those experienced under normal conditions.

By making the spring 44 of the by-pass valve 42 comparatively light, the by-pass valve 42 will only produce a moderate resistance to the flow of resistance liquid from the low pressure to the high pressure ends of the working chambers, and thereby cause the instrument to operate on what is generally known as a one-way principle. If, however, a spring 44 is employed which is comparatively stiff or heavy so that the ball valve 42 will be held shut and not opened until a considerable pressure has been exerted against the resistance liquid in the low pressure ends of the working chambers, then this instrument will operate on the principle of a two-way shock absorber.

It will therefore be apparent that by selecting a spring 44 of the desired tension or resisting capacity, that this shock absorber can be readily organized as a one-way or as a two-way shock absorber and that the shock absorbing effect during the low pressure strokes of the pistons can thus be varied to suit any desired degree of pressure which may be required.

Due to the mounting of the several valves on the same valve body, casing or housing this valve mechanism constitutes a complete unit which can be made independent of any other parts entering into the make-up of the absorber, thereby simplifying the construction, reducing the cost of manufacture as well as rendering the mechanism very compact and permitting of installing the same in absorbers having only a limited amount of space available for its reception.

If desired, this valve mechanism may be mounted on a movable element of the shock absorber, an example of such an organization being shown in Figs. 8, 9 and 10. In the construction shown in these last-mentioned figures the hub 20 of the pistons and the operating shaft 23 are provided with a longitudinal bore or valve chamber comprising a rear part 53 which is comparatively large in diameter and arranged within the adjacent parts of the hub 20 and shaft 23, and a front part 54 of comparatively small diameter arranged wholly within the shaft 23. Within the enlarged rear part 53 of this valve chamber is arranged the tubular body, housing or casing 36 of a valve mechanism which is substantially like that shown and described with reference to the construction shown in Figs. 1–7, and the description of the corresponding parts shown in Figs. 1–7 therefore applies to those shown in Figs. 8, 9 and 10. In this modified arrangement of the valve mechanism the flange 38 at the rear end of the tubular housing 36 engages with a rabbet or countersunk seat 55 at the rear end of the enlarged part 53 of the valve chamber and the resistance liquid is conducted from the high pressure ends of the working chambers to the rear end of the bore 40 of the valve casing by radial ports 56 arranged in the hub and notches 57 formed in the rear side of the flange 38, as shown in Fig. 8.

Communication between the valve chamber in the hub and operating shaft and the low pressure ends of the working chambers is effected by means of radial passages 58 arranged in the hub of the pistons and extending from the valve chamber section 53 to the low pressure ends of the working chambers. The flange 38 of the valve casing shown in Fig. 8 is preferably held in engagement with the rabbet or countersunk seat 55 by friction and if for any reason it is desired to remove this valve mechanism this can be easily done by employing a knock-out tool which may be introduced through the front end of the narrow or reduced section 54 of the valve chamber, which latter is normally closed at its front end by means of a screw plug 59. If desired however the reduced end 54 of the valve chamber may be omitted and this part of the operating shaft 23 left solid, as shown at 60 in Fig. 11, in which case other means must be employed for removing the valve mechanism from the hub and shaft when required.

In the modified form of the mechanism shown in Fig. 11 the ball by-pass valve shown in Figs. 3 and 8 is replaced by a by-pass valve 61 which is made of spring sheet metal in the form of the letter C and engaged with the inner side or bore of the valve casing 36 so that one end of this valve extends across a by-pass port 62 leading from the bore 40 of the valve casing 36 to the periphery thereof within the enlarged part 53 of the valve chamber in the piston 20 and shaft 23. This valve 61 although free to contract and uncover the port 62 for permitting resistance liquid to pass from the low pressure ends to the high pressure ends of the working chambers during low pressure rebound strokes of the pistons is nevertheless held against rotary motion and also against movement lengthwise of the axis of this mechanism by a lug 63 arranged on the fixed end of this valve and engaging with a recess or notch 64 in the bore of the valve body 36, as shown in Figs. 11 and 12.

An advantage inherent in the construction shown in Figs. 11 and 12 is that the use of the C-shaped spring 61 as a by-pass valve produces a silent operation and avoids noise which is liable to be produced by the ball valve 42.

The construction of valve mechanism shown in Figs. 1–7 is such that it precludes the possibility of assembling the valve as a unit externally of the absorber and instead necessitates completing the assemblage of the same with the upper partition section 17 before the latter is introduced into the body of the absorber.

The construction of valve mechanisms shown in Figs. 8–12 can however be assembled completely as a unit externally of the remaining parts of the absorber and can also be perfectly calibrated to the desired strength to suit the particular use for which the instrument is intended.

In Figs. 13–16 this valve mechanism in a modified form is shown in connection with a shock absorber of the reciprocating piston type. In its general organization this last-mentioned shock absorber is constructed as follows:

The numeral 65 represents the body of the absorber which is attached to the frame of the car by bolts passing through lugs 91 on this body and provided on its lower part with an upright working chamber 66 of cylindrical form, and its upper part with a replenishing chamber 67 which communicates with the upper end of said working chamber.

Within the working chamber 66 a piston reciprocates which in its general construction comprises upper and lower supporting disks 68 and 69 which receive between them a cup-shaped packing ring 70 of leather or similar material which also engages with the bore of the working chamber 66, these three members being connected with each other at different points along their marginal portions by means of a solid rivet 71 and a plurality of hollow rivets 72. This piston is mounted on the lower end of a vertically movable piston rod 73, which latter is provided at its lower end with a reduced neck 74 passing through corresponding openings in the center of the upper and lower disk 68, 69 and the interposed packing 70, these parts being confined on this neck between a downwardly facing shoulder 75 formed on the piston rod and bearing against the upper disk 68 and a screw nut 76 arranged on the lower end of the neck 74 and exerting pressure against the underside of the lower disk 69. The bores of the hollow rivets 72 form passages for permitting the resistance liquid to pass from the space within the body 65 above the piston downwardly into the space within the working chamber 66 below the piston during the upward or low pressure strokes of the piston, but during the downward rebound strokes of the piston in the working chamber 66 the by-passes in the hollow rivets 72 are closed by a clack valve 77 consisting of a sheet of flexible material having a part thereof secured between the underside of the lower disk 69 and the upper side of the screw nut 76 and the head of the rivet 71, while another part thereof is free to swing toward and from the lower ends of the several hollow rivets 72, as best shown in Figs. 13 and 15.

A reciprocating motion is imparted to the pistons 68, 69, 70 by means of a rock shaft 78 which is journaled in a bearing 79 in the side of the housing or body 65 and provided within the upper part of this housing with an internal rock arm 80 which is connected with the upper end of the piston rod 73 while its outer end is provided with an operating arm 81 which is adapted to be connected with an axle of the car or other part of the same which moves relatively to the frame of the car.

The valve mechanism which embodies my improvement, as shown in the piston type of shock absorber, see Figs. 13 and 16, is constructed as follows:

The lower part of the piston rod 73 is provided with an axial bore or passage 82 which opens at its lower end into the working chamber below the piston while its upper end terminates short of the upper end of this piston rod and is provided with a comparatively large lower high pressure relief port 83 leading from the bore 82 to the periphery of this piston rod, and an upper comparatively small relief low pressure port 84 also extending from the bore 82 to the periphery of the piston rod.

Above the piston a high pressure or maximum relief valve 85 is mounted on the piston rod which in its preferred form has the shape of the letter C and is made of sheet spring metal which encircles the adjacent part of the piston rod so that the free end of this spring valve normally covers the port 83 while its opposite or fixed end is provided with an inwardly projecting lug 86 which engages with a recess 87 in the adjacent part of the plunger rod 73 so as to anchor these parts together and prevent the high pressure relief valve from rotating on the piston rod and becoming displaced. Above the high pressure relief valve is arranged a low pressure relief valve 88 which is also constructed of sheet spring metal in the form of the letter C so that one end of the same covers the low pressure relief port 84, as shown in Fig. 14. This low pressure relief valve 88 is held against movement lengthwise of the piston rod by a shoulder 89 formed on the piston rod and engaging with the upper edge of the valve 88 and a washer 90 surrounding the piston rod and interposed between the lower edge of the low pressure relief valve 88 and the upper edge of the high pressure relief valve 85, as shown in Fig. 13.

During normal operation of this shock absorber when the car is subjected to ordinary shocks and the piston moves downwardly in the working chamber 66 at a moderate rate, then the pressure exerted against the resistance liquid below the piston only opens the low pressure relief valve 88 and permits some of the resistance liquid to flow from the working chamber 66 through the piston rod and low pressure relief port 84 into the replenishing chamber 67 in the upper part of the valve housing. When, however, the car is subjected to a severe and sudden shock which causes the piston to descend more rapidly in the working chamber during rebound then the pressure of the piston against the resistance liquid in the working chamber rises above normal and not only opens the low pressure relief valve 88 but also exerts lateral pressure against the free end of the high pressure relief valve 85 so that the latter is expanded and uncovers the high pressure relief port 83 which permits an additional amount of resistance liquid to escape from the working chamber 66 through the piston rod and port 83 into the replenishing chamber 67 in the upper part of the absorber housing. In order to effect this sequence in operation of the high and low pressure relief valves and also permit the low pressure relief valve to operate either by itself or in unison with the high pressure relief valve, the metal of which these valves are made and the thickness or size of these valves is properly determined to secure this action.

In each of the several forms of my invention the valve mechanism constitutes a single complete unit which accomplishes three distinct functions, and operates as a means for releasing the resistance liquid when the same is subjected to a low or normal working pressure, also releasing an additional amount of the resistance liquid when the instrument is operating under a high or maximum pressure, and thus serves as a blow-off valve for permitting the excess load to be taken off the absorber and the same also has means for replenishing or re-filling with resistance liquid the compression or high pressure end of the spaces on the high pressure side of the piston after each shock absorbing operation.

Moreover this valve mechanism is exceedingly simple in construction and capable of being produced at low cost. The same can be very readily applied to and removed from the supporting member of the shock absorber designed to receive it, and as the same is very small in compass it is applicable to shock absorbers of smaller size and can also be accurately calibrated so that the instrument can be readily adapted for different installations or requirements.

I claim as my invention:

1. A hydraulic shock absorber comprising a body having an upright working chamber in its lower part and a replenishing chamber in its upper part, a piston movable vertically in said chamber and having a by-pass port connecting the working chamber and said replenishing chamber, a by-pass valve controlling said by-pass port, a piston rod connected with said piston and provided with a longitudinal bore opening at its lower end into said working chamber below the piston and provided above the piston with laterally extending high and low pressure relief ports, a C-shaped high pressure relief valve surrounding said piston rod and covering the high pressure relief port, and a C-shaped low pressure relief valve surrounding the piston rod and covering said low pressure relief port.

2. A hydraulic shock absorber comprising a body having an upright working chamber in its lower part and a replenishing chamber in its upper part, a piston movable vertically in said chamber and having a by-pass port connecting the working chamber and said replenishing chamber, a by-pass valve controlling said by-pass port, a piston rod connected with said piston and provided with a longitudinal bore opening at its lower end into said working chamber below the piston and provided above the piston with laterally extending high and low pressure relief ports, a C-shaped high pressure relief valve surrounding said piston rod and covering the high pressure relief port, a C-shaped low pressure relief valve surrounding the piston rod and covering said low pressure relief port and a washer interposed between said relief valves.

3. A relief valve structure for hydraulic shock absorbers comprising a housing having an axially extending passage therein, an outlet port extending radially from said passage through the housing wall, a relief valve in the form of a band encircling said housing and anchored at one end thereto and with its other end overlying said port, said band closing said port against comparatively low fluid pressure but yielding to open said port when the pressure becomes excessive.

4. A relief valve structure for hydraulic shock absorbers comprising a tubular casing having a passageway therein and a fluid outlet from said passage, a valve responsive to normal fluid pressure to open said outlet, and a relief port through the side wall of said housing, a valve for said port in the form of a C-shaped band surrounding said housing with one end overlapping said relief port, said band holding said relief port closed against normal fluid pressure but being resilient to respond to abnormal pressure to open said relief port.

5. A relief valve structure for shock absorbers comprising a tubular casing having a fluid passageway therein, a radially extending port in the wall of said casing, a relief valve in the form of a band concentric with said casing and anchored at one end thereof of the free end of said band extending across said relief port to hold said port closed against the flow of fluid therethrough under normal pressure but being yieldable to open said port for flow therethrough of fluid under abnormal pressure.

6. A relief valve structure for hydraulic shock absorbers comprising a housing having an axially extending passage therein, a radially extending port in the wall of said housing, a relief valve in the form of a band concentric with said housing and having a lug extending from one end thereof and said housing having a recess for receiving said lug whereby said band is prevented from turning, the free end of said band extending across said port to hold said port closed against the flow of fluid therethrough under normal pressure but being yieldable to open said port for flow therethrough of fluid under abnormal pressure.

7. A relief valve structure for hydraulic shock absorbers comprising a cylindrical housing having a passageway extending therein, one end of said housing being of reduced external diameter to provide an abutment shoulder intermediate the ends of said housing, the outer end of said reduced part of said housing having a circumferential groove therein, a split ring in said groove forming another abutment, a radially extending relief port for connecting said passage with the exterior of said housing, and a relief valve in the form of a split ring encircling said housing between said shoulders and having one end anchored to said housing and the other end overlying said port.

8. A relief valve structure for hydraulic shock absorbers comprising a cylindrical housing having a passageway extending therein and having one end of reduced external diameter forming an inner abutment shoulder, the outer end of said reduced part of the housing having a circumferential groove therein, there being an outlet port extending radially from said passage through the housing wall at said groove, a relief valve in the form of a band engaging in said groove and having one end anchored to said housing and its other end overlying said port, said relief valve forming an outer abutment shoulder, there being a second outlet port from said passageway at a point between said abutment, and a second relief valve in the form of a band encircling said housing between said abutment and having one end anchored to said housing and its other end overlying said second port.

ANTHONY B. CASPER.